(No Model.)

M. B. CHURCH.
SIGN.

No. 259,491. Patented June 13, 1882.

Witnesses

Inventor
Melvin B Church
by Ellis Spear.
Attorney

United States Patent Office.

MELVIN B. CHURCH, OF GRAND RAPIDS, MICHIGAN.

SIGN.

SPECIFICATION forming part of Letters Patent No. 259,491, dated June 13, 1882.

Application filed January 13, 1882. (No model.)

*To all whom it may concern:*

Be it known that I, MELVIN B. CHURCH, of Grand Rapids, in the county of Kent and State of Michigan, have invented a new and useful Improvement in Signs; and I do hereby declare that the following is a full, clear, and exact description of the same.

My invention relates to an improved sign, such as are commonly used to advertise goods.

The object of the invention is both to improve the appearance of these signs and at the same time to cheapen their manufacture.

Hereinafter I have given a general description of the invention, and have indicated in the claims the particular parts which I deem to be new.

I form my improved sign of a plastic material, which is molded or pressed upon a surface of board or like material, whereby raised letters of the plastic substance are caused to adhere to the board and to be formed thereon.

Figure 1:
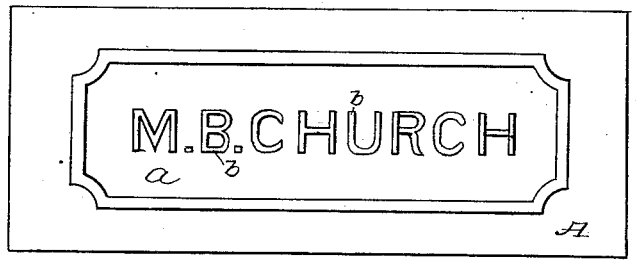
Figure 2:
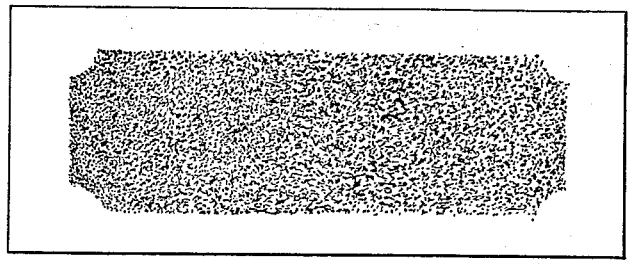
Figure 3:
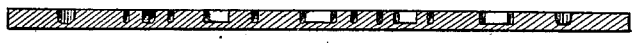
Figure 4:

In the accompanying drawings, Figure 1 represents the sign in front elevation. Fig. 2 represents the board upon which the letters are to be formed with its surface roughened. Fig. 3 is a central longitudinal section of the mold, and Fig. 4 a like section of the sign.

In carrying out my invention I take a suitable board, preferably of some ornamental wood. This should be thoroughly seasoned and kept on edge to prevent warping. This board I have marked A. It should be quite plain, and the surface outside the panel *a*—that is, outside the surface where it is intended to produce the sign—may be smooth; but the surface of the panel should be roughened or grooved in order that the plastic material of which the letters or characters of the sign are composed may adhere thereto. On such a board I form the desired letters or characters by the following method: I first form a pattern of the desired size and form, with raised letters *b*, which may be of any shape, either rectangular in section or rounded, as preferred. The mold or cast is formed in metal or any other suitable material from this pattern, and as the sign is usually made of plaster-of-paris, which requires some time to set, I make a considerable number of these molds, in order to keep the workman suitably supplied when making the signs. The mold or molds are then supplied with the plastic material of any desired thickness in sufficient quantity to slightly more than fill the sunken letters of the mold, and is then ready to receive the board. Upon the board, outside the panel, where it is desired that the plaster should not adhere, some oily substance—such as paraffine or its equivalent—is rubbed. The part inside the panel is rough, so that the plaster will readily adhere to it. I then place the board thus prepared on the mold in such a position that the letters in the mold will, when transferred to the surface of the board, be exactly in the center. I then clamp the board to the mold and subject it to a pressure sufficient to spread the plaster not required to fill the sunken letters evenly and smoothly over the whole surface of the board within the panel in a thin coat, and completely cover the rough parts of the board. It will be understood that after the board is clamped to the mold it must be allowed to remain long enough for the material to harden or set. Where the oil is applied to the board the plaster will not adhere, so that the panel and letters only remain. An advantage also arises by the use of oil—that is, by the use of it upon the only exposed part of the surface of the board the said surface is rendered impervious to water. The parts where it is intended to have the plaster adhere should in all cases be roughened or grooved.

When completed the sign consists of a plain board having raised letters in plaster-of-paris on a background of the same material.

It is obvious that other plastic material may be used instead of the plaster-of-paris, and that colored material may be employed to suit the fancy.

Instead of the roughening, or with it, some adhesive material may be placed on that part of the board where the plaster is required to adhere.

Having thus described my invention, what I claim as new, and desire to secure by Letters Patent, is—

1. The process of forming a sign of plastic material upon a board, consisting, first, in forming a roughened panel or surface on such board;

further, in covering that portion of the board outside the panel with oil or other material to prevent adhesion; further, in making a mold having sunken letters or other objects to be transferred; further, in filling such sunken letters and covering the face of the mold with plastic material; and, lastly, in pressing the mold against the previously-prepared board, whereby the roughened panel receives the impression formed in the mold and also a background of smooth plastic material.

2. An improved sign, consisting of a board or panel and a coating of plastic material attached thereto by pressure, and having raised letters or other objects formed on it.

In testimony whereof I have signed my name to this specification in the presence of two subscribing witnesses.

M. B. CHURCH.

Witnesses:
E. A. DICK,
DAVID H. MEAD.